United States Patent
Bearden

(10) Patent No.: US 7,210,888 B2
(45) Date of Patent: May 1, 2007

(54) BALE HAULING SYSTEM

(76) Inventor: Frank Bearden, 2165 Sloppy Floyd Lake Rd., Summerville, GA (US) 30747

( * ) Notice: Subject to any disclaimer, the term of this patent is extended or adjusted under 35 U.S.C. 154(b) by 149 days.

(21) Appl. No.: 10/999,328

(22) Filed: Nov. 30, 2004

(65) Prior Publication Data

US 2006/0182522 A1    Aug. 17, 2006

(51) Int. Cl.
B60P 1/38    (2006.01)

(52) U.S. Cl. ............ 414/24.5; 172/439; 414/483; 414/459

(58) Field of Classification Search ........... 414/24.5, 414/459, 483; 172/439
See application file for complete search history.

(56) References Cited

U.S. PATENT DOCUMENTS

| | | |
|---|---|---|
| 2,151,870 A | 3/1939 | Raven |
| 3,082,891 A | 3/1963 | Hessler et al. |
| 3,143,749 A | 8/1964 | Buchholz et al. |
| 3,837,665 A | 9/1974 | Schramm |
| 3,866,935 A | 2/1975 | Nelson |
| 4,023,693 A | 5/1977 | Priefert |
| 4,072,241 A | 2/1978 | Parker et al. |
| 4,076,137 A * | 2/1978 | Kucera ............ 414/460 |
| 4,204,789 A | 5/1980 | Parks, Jr. |
| 4,390,312 A | 6/1983 | Skeem |
| 4,396,331 A | 8/1983 | Forster |
| 4,573,846 A | 3/1986 | Willbanks et al. |
| 5,029,650 A * | 7/1991 | Smit ............ 172/5 |
| 5,071,304 A | 12/1991 | Godfrey |
| 5,137,297 A | 8/1992 | Walker |
| 5,433,578 A | 7/1995 | Honan |
| 5,630,689 A | 5/1997 | Willis |
| 5,630,693 A | 5/1997 | Sobina |
| 5,690,182 A * | 11/1997 | Ward ............ 172/439 |
| 5,743,701 A * | 4/1998 | Green ............ 414/498 |
| 5,820,149 A | 10/1998 | Sobina |
| 5,950,735 A * | 9/1999 | Godbersen ............ 172/439 |
| 6,000,899 A * | 12/1999 | Lowe ............ 414/111 |
| 6,102,370 A | 8/2000 | Johnston |
| 6,179,540 B1 * | 1/2001 | Savage ............ 414/24.5 |
| 7,048,070 B2 * | 5/2006 | Powell ............ 172/439 |

* cited by examiner

*Primary Examiner*—Charles A. Fox
(74) *Attorney, Agent, or Firm*—Gardner Groff Santos & Greenwald PC

(57) ABSTRACT

A trailer for hauling cylindrical bales includes a carrier for the bales, wheels on the carrier, an elevation adjustment mechanism for raising and lowering the carrier, and a hitch for coupling to a towing vehicle. The carrier has two inwardly extending bottom flanges that are spaced apart and define an opening between them, and an open end through which the bales pass during loading and unloading. When moving the carrier into engagement with one of the bales resting on the ground, the bale stays generally still due to friction from the bale contacting the ground through the opening and the bottom flanges slide under the bale to load the bale onto the carrier. Additional aspects include an adapter for use with a towing vehicle having a three-point pintle hitch, insert containers that fit into the trailer, and a method of loading and unloading the bales.

19 Claims, 11 Drawing Sheets

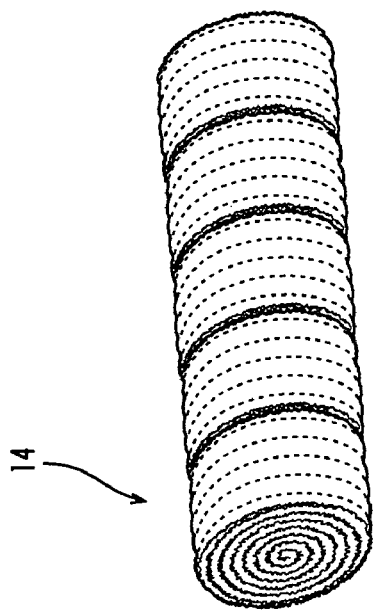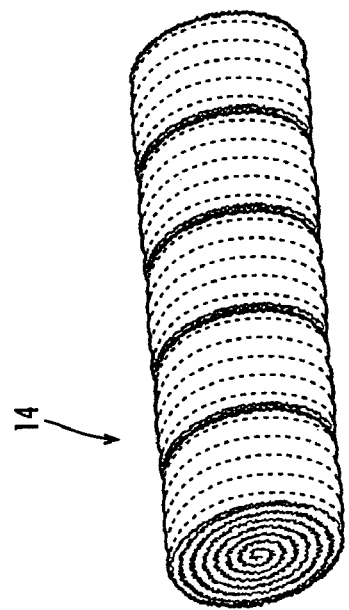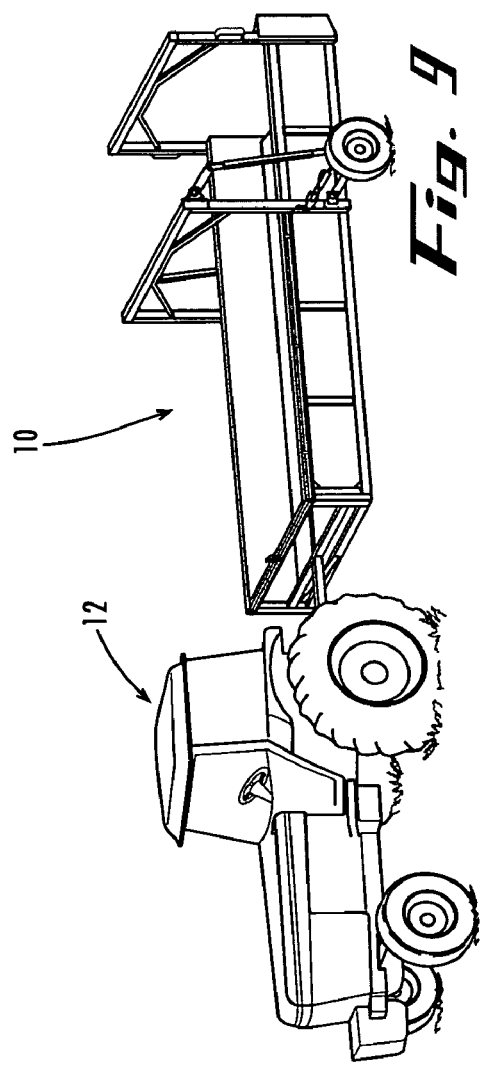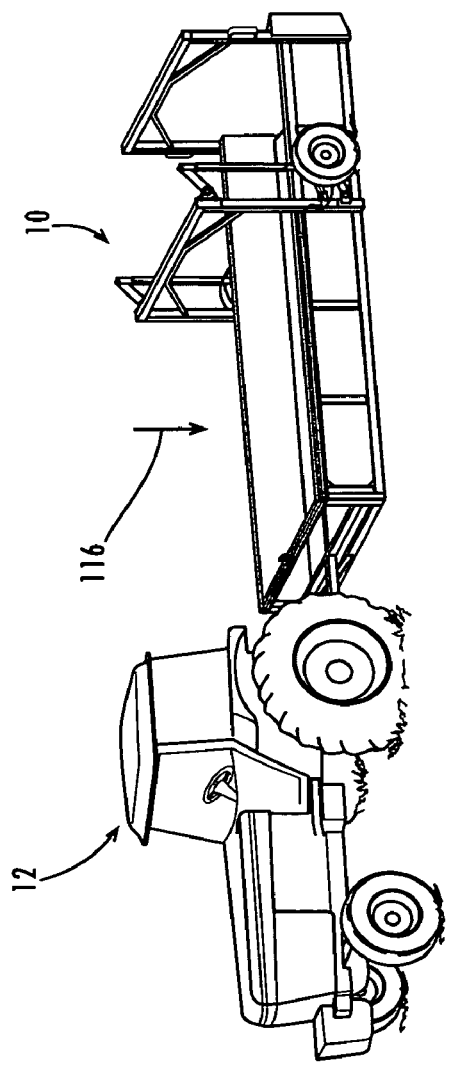
Fig. 9
Fig. 10

BALE HAULING SYSTEM

TECHNICAL FIELD

The present invention relates generally to farm equipment and, in particular, to a trailer for loading, hauling, and unloading cylindrical bales of hay or other material.

BACKGROUND OF THE INVENTION

Farmers feed their livestock by hauling hay out to them in their pastures on a regular basis. Often, the hay is packaged into large cylindrical bales with a diameter of about 6 feet and a length of about 4 or 5 feet. These bales are too large and heavy (several hundred pounds each) to be handled manually. Typically, the farmer uses a tractor with a front-end spur loader to pick up bales of hay, one at a time, and individually haul them out to the field where the cattle or other animals are. This process must be repeated a number of times, with the farmer making as many trips as is needed to feed his animals. Often times the distance of each trip, from the barn out to the pasture, is a mile or more each way. As a result, livestock feeding can be a very time-consuming task. And because so many trips are required, the farmer's tractor burns a lot of fuel, further adding to the cost and inefficiency of hauling hay.

Accordingly, there is a need for a quicker and more efficient way to haul hay out to pastures to feed livestock. It is to providing a solution to this problem that the present invention is primarily directed.

SUMMARY OF THE INVENTION

Generally described, the present invention provides an apparatus for loading, hauling, and unloading cylindrical bales of hay or another material. The apparatus includes a carrier for the bales, wheels on the carrier, and an elevation adjustment mechanism for raising and lowering the carrier. The carrier has two inwardly extending bottom flanges that are spaced apart and define an opening between them.

To use the apparatus, the elevation adjustment mechanism is operated to lower the carrier, and then the carrier is moved into axial engagement with one of the cylindrical bales. The cylindrical bale is lying on its curved side, with a supporting portion of the bale resting on the ground and with two non-supporting portions of the bale adjacent the supporting portion and not contacting the ground. As the carrier is moved backwards, the bale stays generally still due to friction from the supporting portion of the bale contacting the ground through the opening, and at the same time the bottom flanges slide under the two non-supporting portions of the bale to load the bale onto the carrier. In this way, the apparatus can be used to quickly and easily load bales, haul them out to a pasture, and unload them, thereby saving a significant amount of time and money.

In an example embodiment of the invention, the apparatus is in the form of a trailer having two wheels and a trailer hitch coupling for removably connecting to a tractor or other towing vehicle. The carrier preferably has a first side with a bottom portion from which the first bottom flange inwardly extends, an opposing second side with a bottom portion which the second bottom flange inwardly extends, a front end, and an opposing rear end that is open so that the bales can pass through it during loading and unloading.

In addition, the carrier preferably has at least one rear overhead support frame connecting the first and second sides, adjacent the open rear end, and below which the bales pass during loading and unloading. Furthermore, the two bottom flanges and the opening are preferably long enough to receive five, or another number, of the bales on the carrier in series, with the opening extending unobstructed the length of the bottom flanges. And the carrier preferably has lines or other indicia marked on it in serial positions corresponding to the bales to provide the user with a visible indication of whether the bales are properly loaded on or unloaded from the carrier.

The elevation adjustment mechanism preferably includes two pivotal connecting members and two actuators such as fluid cylinders (e.g., hydraulic or pneumatic cylinders). The wheels are mounted to the connecting members, which are pivotally connected to the carrier. And the actuators are operably coupled between the carrier and the wheels. The actuators are operable to pivot the connecting members, which lowers and raises the wheels relative to the carrier, thereby raising and lowering the carrier.

In addition, each wheel rotates independently about its own axle, and the axles do no extend across the opening. In order to raise and lower the wheels together in a coordinated fashion, the elevation adjustment mechanism preferably includes an equalizer assembly. Preferably, the equalizer assembly includes fluid lines and at least one flow divider valve connected to the fluid lines. The fluid lines run to the fluid cylinders and they have connectors for coupling to the hydraulics or other fluid system of the tractor. The flow divider valve adjusts the fluid pressure to the cylinders so that the wheels are lowered and raised together.

In an alternative embodiment, the equalizer assembly includes an overhead axle coupled to an overhead frame, and two linkages between the overhead axle and the wheels. The linkages correlate vertical movement of the wheels so that they are lowered and raised together. Of course, the trailer can be provided with both or other types of equalizer assemblies, if desired.

In another aspect, the invention provides an adapter for hitching the trailer to a tractor or other towing vehicle having a three-point, vertically adjustable, pintle hitch. The adapter has a frame with three vertical U-shaped members and three pins. Each U-shaped member has a plurality of aligned sets of holes, with each hole set receiving one of the pins to couple to the tractor hitch one of a plurality of different possible heights. The adapter also has a vehicle hitch coupling that removably engages the trailer hitch coupling of the trailer.

Preferably, the frame has a vertical middle support member with a middle one of the U-shaped members mounted to it, and the towing vehicle hitch coupling is laterally aligned with the middle support member. The center support member has a viewing hole positioned below the middle U-shaped member and above the vehicle hitch coupling so that the operator can see the vehicle hitch coupling through the viewing hole to make it easier to back the tractor up to the trailer in alignment for hitching up the trailer.

In yet another aspect, the invention provides insert containers that fit into the trailer. The insert containers have a base portion and two overhang portions above and adjacent the base portion. The base portion is received through the opening when the two overhang portions are supported by the bottom flanges. In one example embodiment, the insert container is in the form of a bale rack for holding several of the cylindrical bales, and the bale rack can be loaded onto and unloaded from the trailer for handling a number of bales at once. In another example embodiment, the container is in the form of a feeder rack for loose hay, water, other feed material, or other items such as fence posts, lumber, etc.

And in still another aspect, the invention provides a method of handling cylindrical bales. The method preferably includes the steps of lowering the carrier and moving the it backwards into axial engagement with one of the bales. The bale is positioned with a supporting portion that is resting on the ground and with two non-supporting portions adjacent the supporting portion that are not contacting the ground. When moving the carrier backwards, the bale stays generally still due to friction from the supporting portion of the bale contacting the ground through the opening, and the bottom flanges slide under the two non-supporting portions of the bale to load the bale onto the carrier. After the bale is loaded onto the carrier, the carrier is raised and the trailer is towed to another location for unloading.

The method may include repeating these steps for additional bales, and also moving the carrier backwards until one of the bales correlates to indicia marked on the carrier. The indicia visibly indicate that all of the bales are fully loaded onto the carrier. Additionally, the step of raising the carrier may include lowering the wheels relative to the carrier to raise its rear open end first, and then raising the hitch coupling on the towing vehicle to raise the front end of the carrier, which sequence uses gravity to keep the bales from falling off the carrier. Furthermore, the method may additionally include the steps of lowering the carrier, moving the carrier forward to unload the bale, and raising the carrier. When moving the trailer forward, the bale stays generally still due to friction from the supporting portion of the bale contacting the ground through the opening, and the bottom flanges slide from under the two non-supporting portions of the bale to unload the bale from the carrier.

The specific techniques and structures employed by the invention to improve over the drawbacks of the prior devices and accomplish the advantages described herein will become apparent from the following detailed description of the example embodiments of the invention and the appended drawings and claims.

BRIEF DESCRIPTION OF THE DRAWINGS

FIG. 9 is a perspective view of the trailer and tractor of FIG. 1, showing the trailer being backed up to five bales.

FIG. 10 is a perspective view of the trailer and tractor of FIG. 1, showing the trailer being lowered from a hauling position to a loading/unloading position on the ground.

FIG. 11A is a schematic rear end view of the trailer of FIG. 11 shown loading one of the bales.

DETAILED DESCRIPTION OF AN EXAMPLE EMBODIMENT

Figure 1:
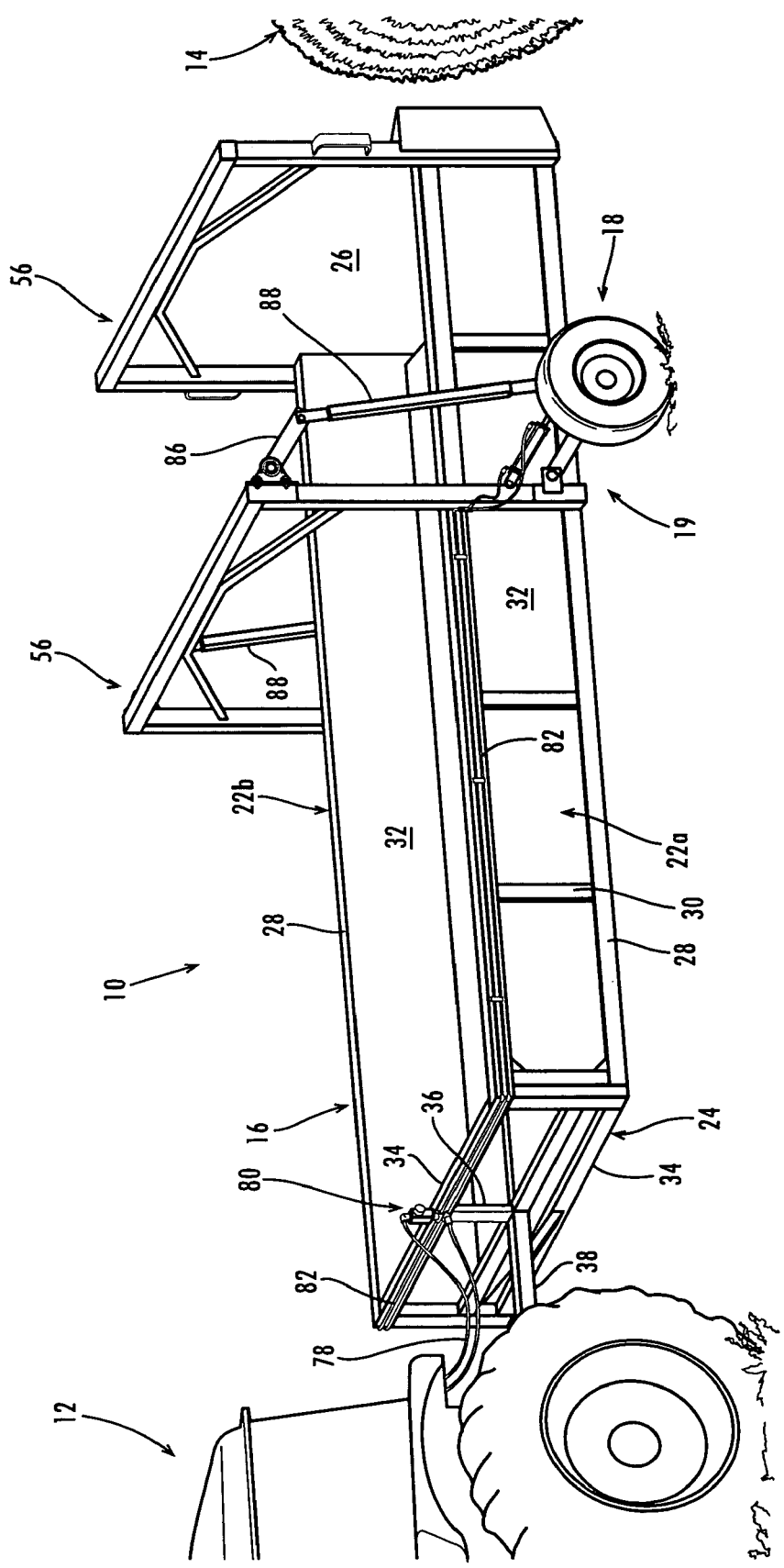
FIG. 1 is a perspective view of a bale-handling trailer according to an example embodiment of the present invention, showing the trailer towed by a tractor.
Figure 2:
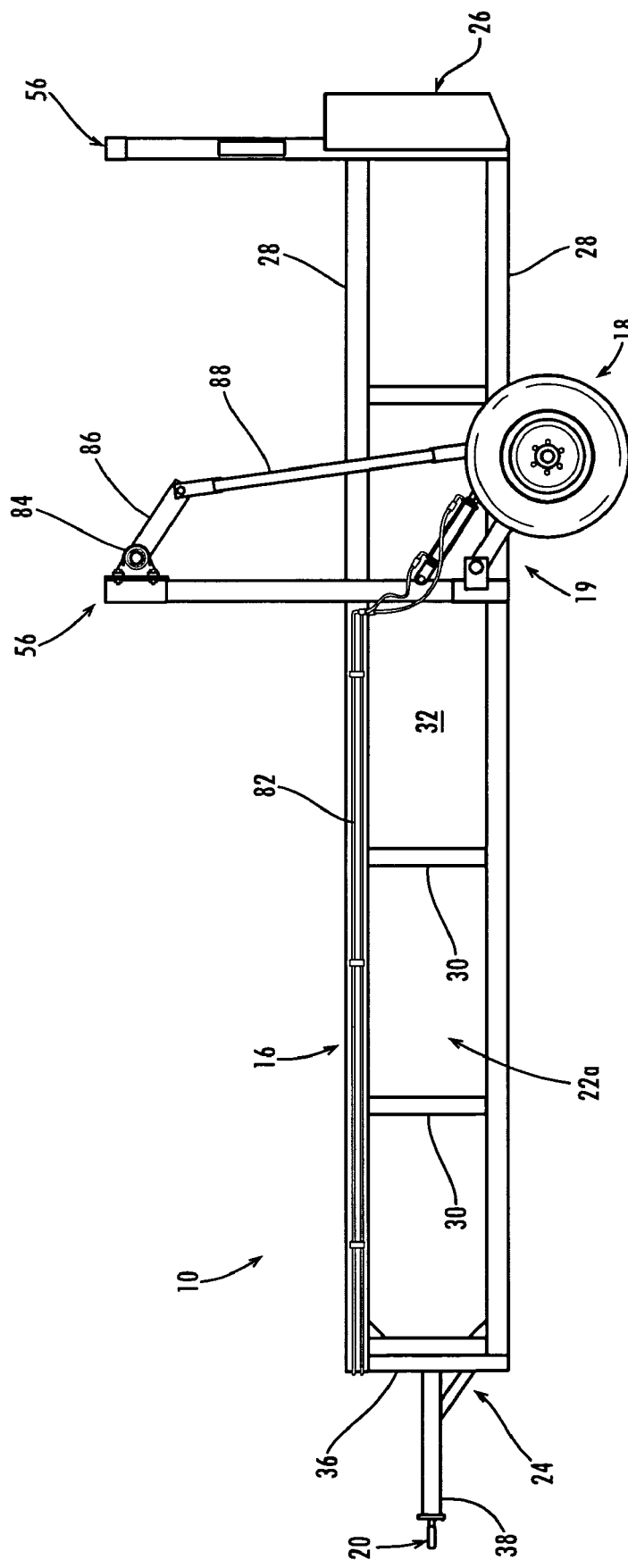
FIG. 2 is a side view of the trailer of FIG. 1, showing a carrier with wheels, an elevation adjustment mechanism, and a hitch.
Figure 3:
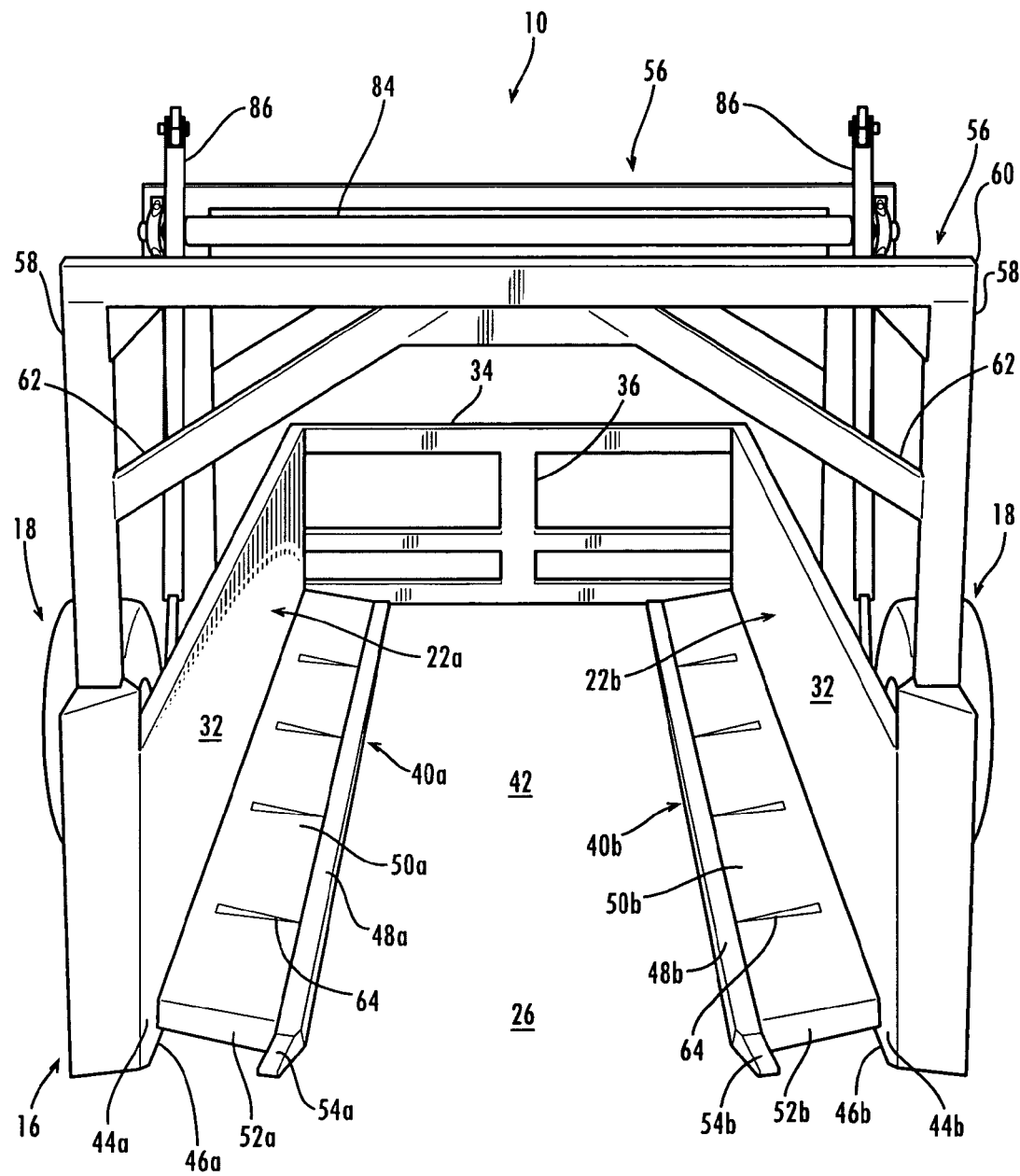
FIG. 3 is an end perspective view of the trailer of FIG. 1, showing bottom flanges defining an opening in the carrier.

Referring now to the drawing figures, FIGS. 1–3 illustrate the major components of a trailer 10 according to an example embodiment of the present invention. The trailer 10 is designed to be towed by a tractor 12 and used to load, haul, and unload cylindrical bales 14 of hay. It will be understood, however, that the trailer 10 may be towed by a truck or another towing vehicle. In addition, the trailer 10 may be used to handle cylindrical bales of other materials. And the trailer 10 may even be used, though probably not as effectively, to handle rectangular or other-shaped bales of hay or other materials.

The trailer 10 includes a carrier 16 for supporting the bales, wheels 18 on the carrier, an elevation adjustment mechanism 19 for raising and lowering the carrier, and a trailer hitch coupling 20 for removably connecting to the tractor 12. Preferably, the trailer 10 has two wheels 16 of a type commonly used for trailers, though more or fewer wheels and/or another type of wheel can be used. And the trailer hitch coupling 20 may be an eyelet (as shown) of a multi-hitch assembly (pintle with ball), or one of two mating components of a ball hitch assembly, a receiver hitch assembly, or another conventional hitch assembly for use on trailers.

The carrier 16 preferably has a first side 22a, a second side 22b opposite the first side, a front end 24, and a rear end 26. The rear end 26 is open so that the bales 14 can pass through it for loading and unloading. The front end 24 and sides 22a and 22b of the carrier may be solid walls, open frames, rails with screening or latticing, or other structures; made of metal, wood, composites, or other materials; have a length extending the full or a partial length of the trailer; and have a height extending the full or a partial height of conventional bales, all selected for containing the bales on the carrier 16. In the depicted embodiment, for example, each of the sides 22a and 22b is constructed of a top and a bottom horizontal piece 28 of 2-inch by 4-inch tubular steel, vertical pieces 30 of 2-inch by 4-inch tubular steel welded or otherwise connected between the horizontal pieces, and pieces 32 of sheet metal welded or otherwise connected to the tubular steel pieces 28 and 30. The front end 24 is constructed of three horizontal pieces 34 of 2-inch by 4-inch tubular steel, and a vertical piece 36 of 2-inch by 4-inch tubular steel. And a horizontal piece 38 of 4-inch by 4-inch tubular steel extends forward from one of the horizontal pieces 34, and has the trailer hitch coupling 20 mounted on it.

Referring to FIGS. 3 and 11A, the carrier 16 has two bottom flanges 40a and 40b that are spaced apart and define an opening 42 between them. The first bottom flange 40a extends inwardly from a bottom portion 44a of the first side 22a of the carrier 16, and the second bottom flange 40b extends inwardly from a bottom portion 44b of the second side 22b of the carrier. The bottom flanges 40a and 40b and the interposed opening 42 are configured to facilitate loading and unloading the bales 14, which processes are described in detail below.

Preferably, the first bottom flange 40a extends inwardly from above a bottom edge 46a of the first side bottom portion 44a and extends downwardly as it extends inwardly, and the second bottom flange 40b extends inwardly from above a bottom edge 46b of the second side bottom portion 44b and extends downwardly as it extends inwardly. In the depicted embodiment, the flanges 40a and 40b are each constructed of a longitudinal piece 48a and 48b of 2½-inch by 2½-inch tubular steel, lateral pieces of 2-inch by 4-inch tubular steel (not shown) welded or otherwise connected between the longitudinal pieces and the bottom horizontal side pieces 28, and pieces 50a and 50b of sheet metal mounted on top of the lateral pieces. To allow for the height of the underlying lateral pieces and to provide a ramp for smoothly loading the bales at the open rear end 26 of the carrier 16, the sheet metal pieces 50a and 50b each have a beveled leading end 52a and 52b, and the longitudinal pieces 48a and 48b also each have a beveled leading end 54a and 54b. And to further facilitate loading and unloading the bales 14, the combined width of the first and second bottom flanges 40a and 40b preferably is less than the width of the opening 42, which provides a good size to opening to allow the bales 14 to frictionally contact the ground during loading and unloading, as described in detail below.

Because of the longitudinal opening 42 and the open rear end 26, the rear end of the carrier 16 is subject to twisting and lateral forces during use. To provide structural support and integrity, the carrier 16 preferably has at least one overhead support frame 56. The overhead support frame 56 extends between and structurally connects the first and second sides 22a and 22b, and has a tall enough height that it does not obstruct the bales 14 passing below it during loading and unloading. One overhead support frame 56 is at the rear half of the carrier, preferably immediately adjacent the open rear end 24, but it may be positioned somewhat forward of the rear end as long as it is far enough back to provide sufficient structural bracing to withstand the twisting and lateral forces. In the depicted embodiment, there are two overhead support frames 56, each constructed of two generally vertical pieces 58 of 4-inch by 4-inch tubular steel and a generally horizontal piece 60 of 4-inch by 4-inch tubular steel welded or otherwise connected between the generally vertical pieces. And angled pieces 62 of 2-inch by 4-inch tubular steel are provided for bracing and positioned so they do not obstruct the cylindrical bales 14 during loading and unloading.

The two bottom flanges 40a and 40b and the opening 42 are preferably long enough to receive a number of the bales 14 on the carrier 16 in series. In the depicted embodiment, for example, the bottom flanges 40a and 40b and the opening 42 have about a 20-foot length selected for carrying five 4-feet long, 6-feet diameter bales 14, or four 5-feet long, 6-feet diameter bales 14. And the opening 42 extends unobstructed the length of the bottom flanges 40a and 40b. It will be understood that the carrier 16 may be longer or shorter to carry more or fewer bales 14, with the overhead support frames 56 provided with a different position, construction, and/or number, as needed for structural support and integrity.

With the carrier 16 shown being designed to carry a plurality of the bales 14, it could be difficult for the user (i.e., the tractor driver) to by himself determine if he has fully loaded or unloaded the bales. For example, when the carrier 16 is carrying four bales 14 and the user wants to unload only one of them, the front-most bales obstruct the user's view and make it hard to tell exactly how far he has to drive forward so that the rear-most bale is fully unloaded, without pulling too far forward that the bale immediately in front of it is also unloaded. To make it easy to determine this, the carrier 16 preferably has indicia 64 marked on it in serial positions corresponding to the bales 14 to provide the user with a visible indication of whether the bales are properly loaded on or unloaded from the carrier. In this way, the user can determine when the rear-most bale 14 is fully loaded on or unloaded off the carrier 16 based on the position of the front-most bale, which can be visibly determined by the relative position of the indicia 64.

For example, the indicia 64 may be provided by lines (as shown), bars, other shapes or figures, slight bumps (e.g., thin slats, rods, or tubes) on or slight recesses (e.g., gaps in the sheet metal) in the bottom flanges 40a and 40b to provide a tactile indication when the bales pass over, or a combination thereof. And the indicia 64 may be painted, adhered, or other otherwise marked on the bottom flanges 40a and 40b and/or on the sides 22a and 22b of the carrier 16. For the five-bale carrier 16 shown, there are preferably four indicia 64 defining the five positions for the bales 14 when fully loaded. Alternatively, the sides 22a and 22b may extend above the bales 14 and there may be five indicia 64 on the sides, each one positioned at about a center of one of the five bale positions when fully loaded. Or the indicia 64 may include the bale positions being painted or otherwise marked with contrasting colors or markings. It will be understood that the indicia 64 may be provided in other ways and quantities that are not expressly detailed herein, but that are nevertheless contemplated by the present invention.

Figure 4:
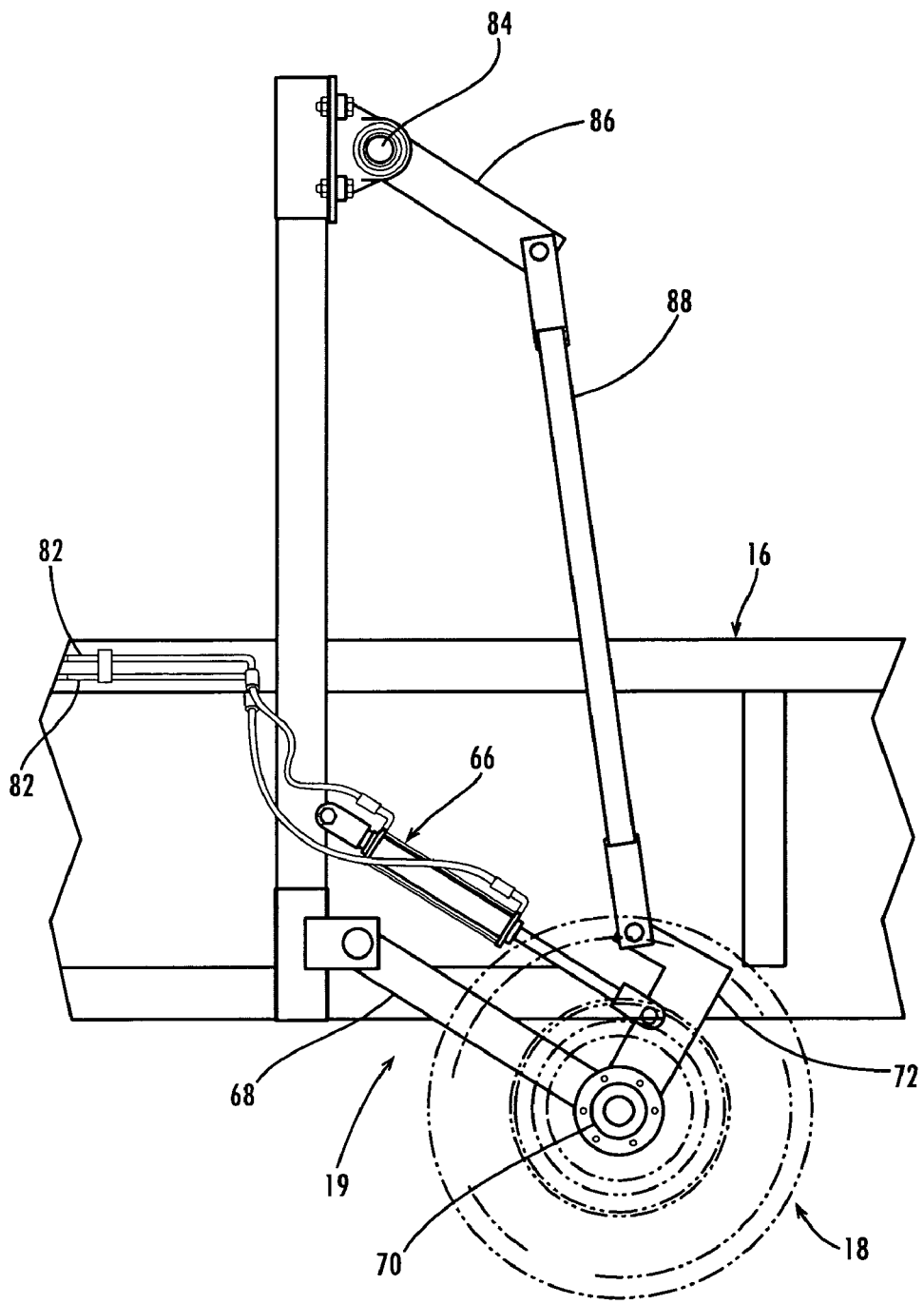
FIG. 4 is a side detail view of a portion of the trailer of FIG. 1, showing the elevation adjustment mechanism in a hauling position with the wheels lowered to raise the carrier.
Figure 5:
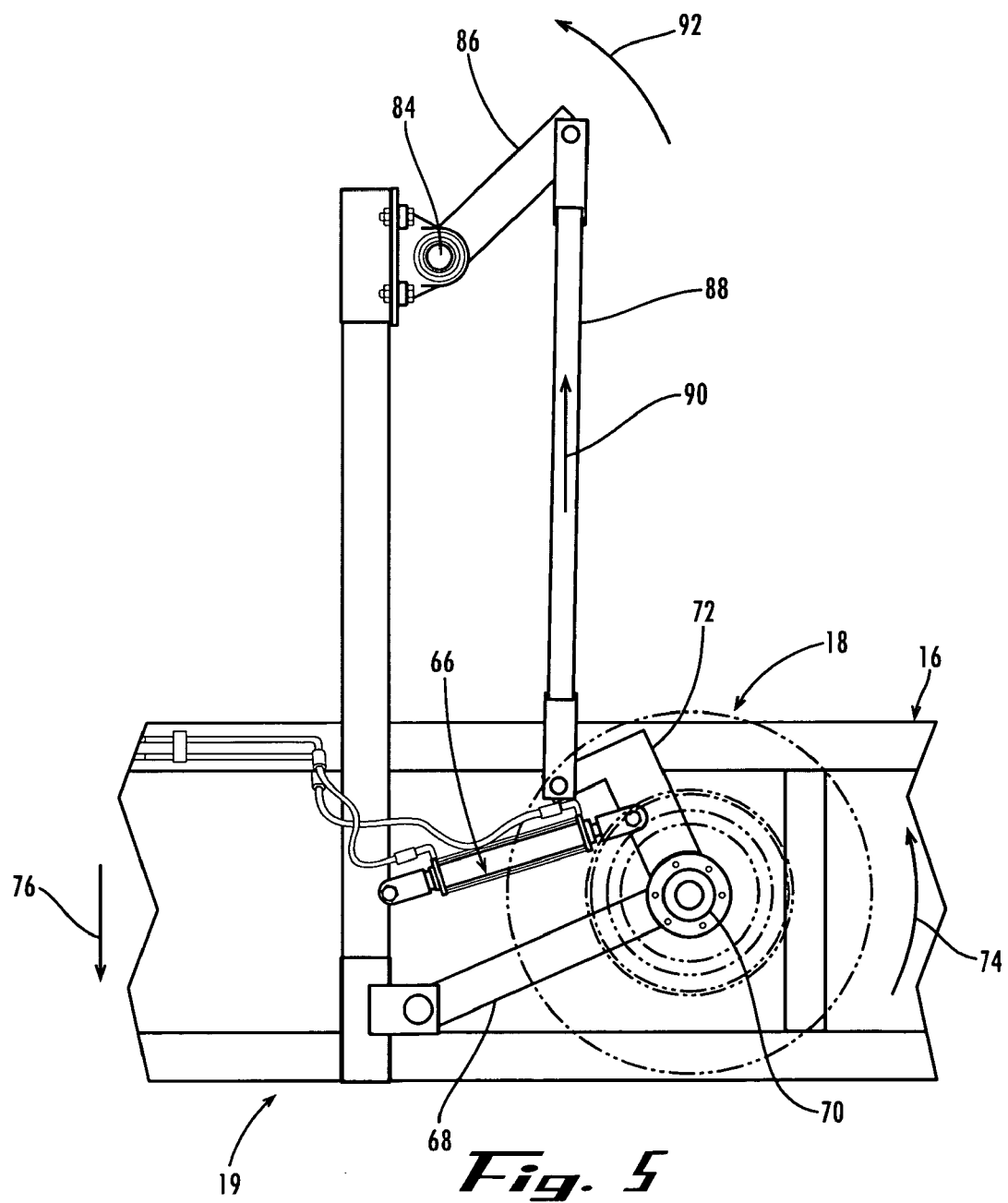
FIG. 5 is a side detail view of a portion of the trailer of FIG. 1, showing the elevation adjustment mechanism in a loading/unloading position with the wheels raised to lower the carrier.

Referring now to FIGS. 4 and 5, details of the elevation adjustment mechanism 19 will now be provided. The elevation adjustment mechanism 19 includes one or more actuators 66 that are operably coupled between the carrier 16 and the wheels 18. In the two-wheeled trailer 10 shown, there are two actuators 66, one for each wheel 18. The actuators 66 are preferably provided by linearly extendable hydraulic cylinders for connecting to the hydraulic system of the tractor, so that the elevation adjustment mechanism 19 is operated by the hydraulic control system of the tractor. In a typical commercial embodiment, for example, the actuators are provided by hydraulic cylinders with a 10-inch stroke, a 3-inch bore, and a 2500-psi rating. Alternatively, pneumatic cylinders, other fluid cylinders, electric actuators, or other linear or rotary actuators may be used.

In the depicted embodiment, the elevation adjustment mechanism 19 includes two connecting members 68 that are pivotally connected to the carrier 16 and two axles 70 that are mounted to the connecting members, with the wheels 18 mounted on the axles. Also mounted to the wheels 18 are two control members 72, to which the actuators 66 are pivotally coupled at a position offset from the wheels. The connecting members 68, axles 70, and control members 72 are preferably made of steel or another metal. And the pivotal connections may be made of pins with bearings to reduce friction, bolted connections with play, or other pivotal connections known in the art and selected to provide the needed movement and strength.

In this configuration, the actuators 66 are operable to adjust the elevation adjustment mechanism 19 to move the carrier 16 between the hauling position of FIG. 4 and the loading/unloading position of FIG. 5. In particular, with the carrier 16 in the hauling position of FIG. 4, when the actuators 66 are operated to linearly retract them, they pull on the control members 72, which pull on the wheels 18, causing the connecting members 68 and the wheels to pivot upward, as shown by directional arrow 74 of FIG. 5. When the wheels 18 are pivotally raised relative to the carrier 16 in this manner, the carrier is lowered, as shown by directional arrow 76, to the loading/unloading position. The carrier 16 can then be raised to the hauling position by reversing the process, that is, by operating the actuators 66 to linearly extend them, which pivots the wheels 18 downward relative to the carrier 16 to elevate the carrier.

It will be understood that the connecting members 68 may be sufficiently long that, when the trailer 10 is raised to the hauling position, the connecting members are at an angle from vertical, as shown in FIG. 4. In this configuration, the wheels 18 can be lowered further to further raise the carrier 16, thereby providing an increased range of adjustable elevations for the carrier. This may be useful to load and unload bales 14 from surfaces above the ground, for example, when the bales are stored on and at the edge of a raised platform or storage rack/shelf, or when stacking bales on each other when storage space is tight.

Alternatively, the wheels may be mounted to the actuators without the connecting members and control members. For example, one actuator may be vertically oriented and fixedly mounted to the carrier for raising and lowering each wheel, or two actuators may be arranged in a "V" shaped and pivotally mounted to the carrier. It will be understood that the actuators may be configured in other arrangements for raising and lowering of the carrier.

In addition, the wheels 18 rotate independently of each other, and the axles 70 do no extend across the opening 42. Because of this, when operating the elevation adjustment mechanism 19 the wheels 18 may tend to raise and lower in an uncoordinated fashion, tilting the carrier 16 to one side or the other. To minimize this, the elevation adjustment mechanism 19 preferably includes an equalizer assembly. The depicted embodiment shows two equalizer assemblies, a first one that includes a hydraulic valve and a second one that includes a mechanical linkage between the wheels. It will be understood that the trailer 10 may be provided with only one of these equalizer assemblies, with both of them, or with another equalizing assembly that works to coordinate the position of the wheels when they are raised and/or lowered.

Referring back to FIGS. 1 and 2, the first equalizer assembly includes a first set of fluid lines 78 having connectors for removably connecting to the hydraulics system of the tractor 12, and two second sets of fluid lines 82 connected to the actuators 66. In addition, the first equalizer assembly includes a flow divider valve 80 connected to one line of the first fluid line set and one line of each of the second fluid line sets. The other line of the first fluid line set is split into the other lines of the second fluid line sets by, for example, a conventional "T" or "Y" fitting, or another flow divider valve. The flow divider valve 80 adjusts the fluid pressure in the connected second fluid lines, to raise and lower the wheels 18 together. In a typical commercial embodiment, for example, the flow divider valve 80 has a 2500 psi rating, which has been found to be about 98% accurate at evenly dividing the fluid flow to keep the carrier 16 level when raising and lowering it.

Referring to FIGS. 1–5, the second equalizer assembly includes an overhead axle 84 rotationally mounted, for example, by block bearings, to one of the overhead frames 56. With the overhead axle 84 so positioned, the bales 14 can pass under it during loading and unloading. In addition, the assembly includes two linkages connecting the overhead axle 84 and the wheels 18. The linkages preferably include offset arms 86 fixedly attached to the overhead axle 84, and drive arms 88 pivotally connected to the offset arms and to the wheels 18. The drive arms 88 are preferably pivotally connected to the wheels 18 at a position on the control members 72 that is spaced apart from the axles 70, with the actuators 66 connected to the control members at a position between the axles and the drive arm connection position. The overhead axle 84, the offset arms 86, and the drive arms 88 are preferably made of steel or another metal. For example, the drive arms 88 may each include a piece of 2-inch by 2-inch tubular steel with a flat piece of steel on each end for connecting to the offset arms 86 and the control members 72.

In this configuration, the wheels 18 are mechanically linked so that their vertical movement is correlated to raise and lower them together without obstructing the opening 42. For example, when one of the wheels 18 is raised, as shown by directional arrow 74 of FIG. 5, this raises the drive arm 88 the wheel is connected to, as shown by directional arrow 90. This rotates the offset arm 86 and the overhead axle 84, as shown by directional arrow 92, which in turn imparts the same motion to the offset arm 86, drive arm, and wheel on the other side.

When including this equalizing assembly, then, it is preferable to position at least one overhead frame 56 proximate to the wheels 18 so that this overhead frame can serve both as a structural support for the carrier 16 and as a mount for the overhead axle 84. It will be understood that the trailer 10 may be provided with only this one overhead frame at the wheels 18, thereby eliminating the overhead frame at the rear end 26. To ensure that the needed structural support is provided, it may be desirable to construct the single overhead frame with stronger members and/or to shorten the carrier 16.

Figure 6:
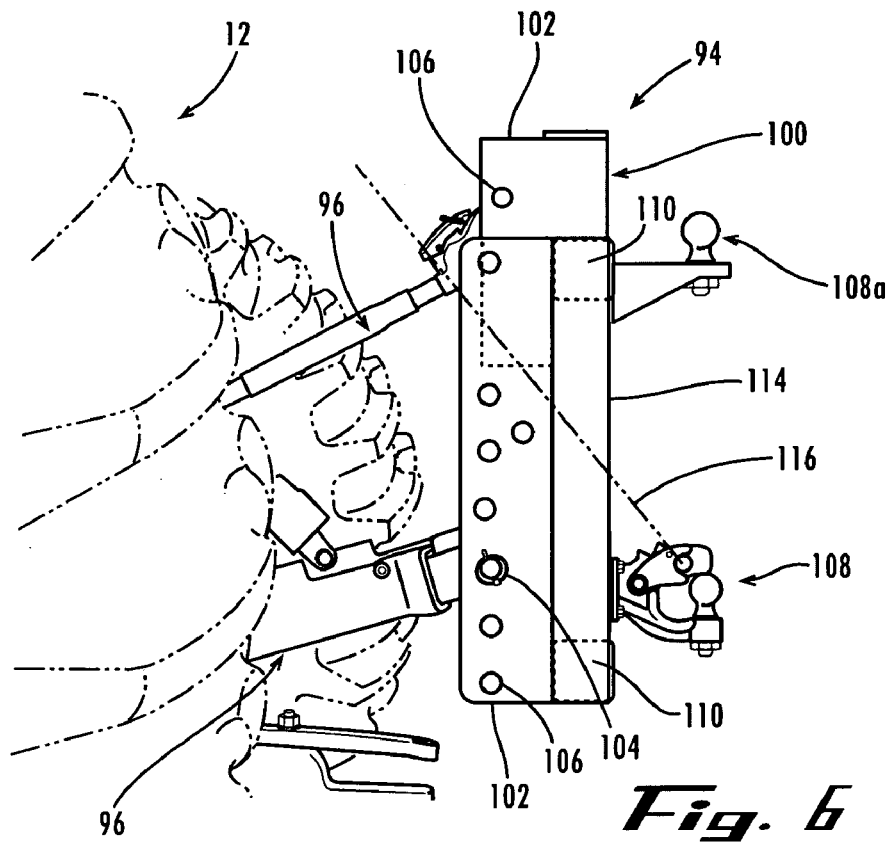
FIG. 6 is a side view of an adapter for connecting the trailer of FIG. 1 to a three-point pintle hitch on a tractor.
Figure 7:
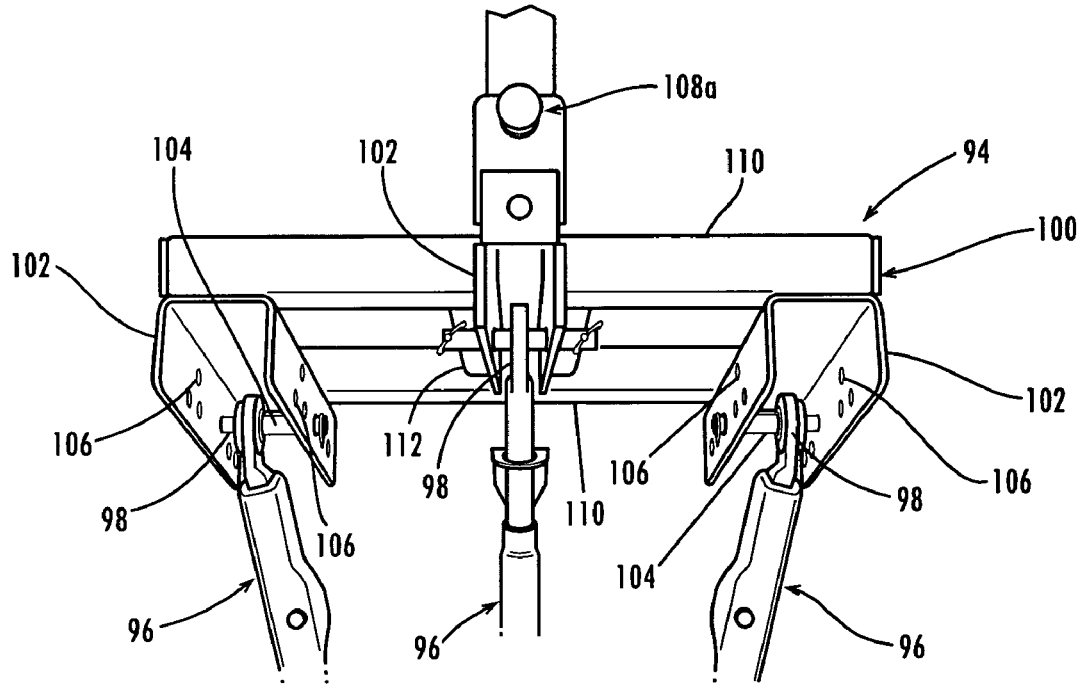
FIG. 7 is a top perspective view of the adapter of FIG. 6.
Figure 8:
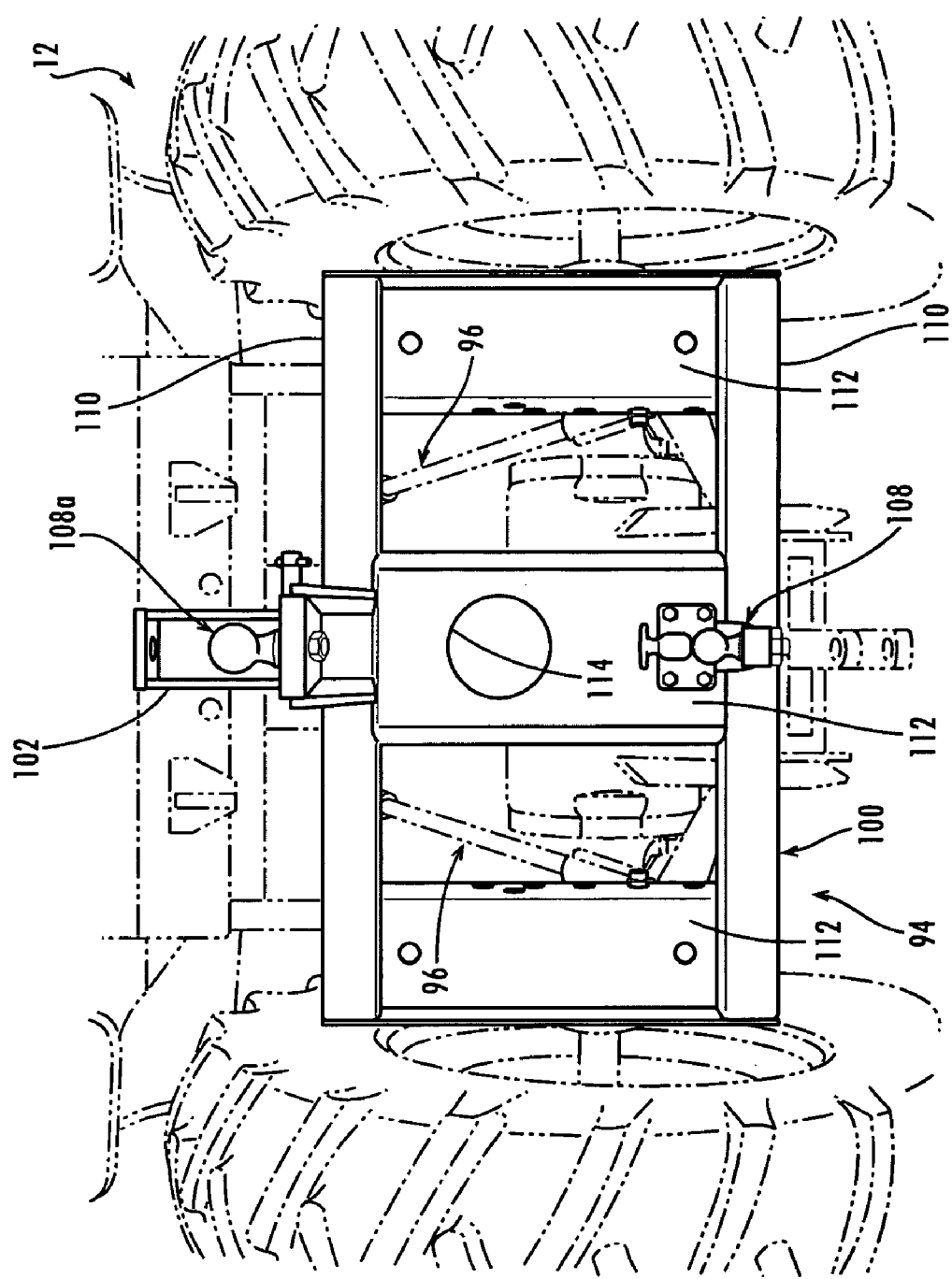
FIG. 8 is a side view of the adapter of FIG. 6.

Turning now to FIGS. 6–8, there are shown details of an adapter 94 for connecting the trailer 10 to a pintle hitch on the tractor 14. Many conventional tractors 14 have a three-point pintle hitch for towing a variety of farm equipment such as combines and backhoes. Typically, the pintle hitch is vertically movable, operated by an on-board hydraulics system, and controlled by hydraulic controls positioned by the driver's seat of the tractor 14. The three-point pintle hitch has three arms 96 each having a tractor pintle coupling such as the eyelet 98 shown.

The adapter 94 has a frame 100 with three vertical U-shaped members 102 and three pins 104. The frame 100 and the U-shaped members 102 are preferably made of steel or another metal, and the U-shaped members provided by lengths of commercially available channel. Each U-shaped member 102 has at least one set of horizontally aligned holes 106 and can receive one of the pintle eyelets 98 in horizontal alignment with the holes 104 so that one of the pins 104 can be inserted through the aligned holes and the pintle eyelet. Preferably, each U-shaped member 102 has a plurality of the sets of aligned holes 106 so that the adapter 94 can be coupled to the tractor 14 at any one of a number of different possible heights. This provides flexibility in the use of the trailer 10, as the front end now has a greater range of adjustable elevations to go along with the range of adjustable elevations for the carrier 16 provided by the elevation adjustment mechanism 19, as described above. And the trailer 10 can now be used with a variety of different tractors or other towing vehicles, which may have different hitch heights and/or more or fewer pintles hitches (not every U-shaped member need be hitched to, and not every tractor pintle need be hitched to).

In addition, the frame 100 has mounted to it a vehicle hitch coupling 108 (such as the shown pintle and ball assembly of a multi-hitch assembly) for removably engaging the trailer hitch coupling 20 (such as the eyelet shown in FIG. 1) of the trailer 10 to secure the trailer for towing. Alternatively, the trailer hitch coupling 108 may be provided by one of two mating components of a ball hitch assembly, a receiver hitch assembly, or another conventional hitch assembly for use on towing vehicles. And a secondary vehicle hitch coupling 108a (such as the ball hitch shown) may be provided at a different height to provide additional flexibility and a greater range of adjustable elevations for the carrier 16, and/or for hitching and towing a gooseneck trailer. Alternatively, the secondary trailer hitch coupling 108a may be provided by one of two mating components of a multi-hitch assembly, a receiver hitch assembly, or another conventional hitch assembly for use on towing vehicles.

In the depicted embodiment, the frame 100 includes top and bottom horizontal frame members 110, with the U-shaped members 102 mounted to them. Also, the frame 110 includes one or more vertical support members 112 extending between and mounted to the horizontal frame members 110. Preferably, there are three of the vertical support members 112, with two of them at opposing sides of the frame 100 and one of them in about the middle of the frame. In this way, the three U-shaped members 102 may be mounted to the vertical support members 112 to provide good strength with minimal material used. Thus, the middle one of the vertical support members 112 has the middle one of the U-shaped members 102 aligned with it and mounted to it, with the two of them aligned with the towing vehicle hitch coupling 108 and/or 108a (see FIG. 7).

In addition, the middle support member 112 has a viewing hole 114 positioned below the middle U-shaped member 102 and above the vehicle hitch coupling 108 to provide a line of sight 116 from the operator's seat, through the hole, and to the hitch. Alternatively, the frame 110 may have a single support member extending the lateral length of the frame, if desired, with the hole 114 in the middle of it. The viewing hole 114 is preferably circular, but alternatively it may have another regular or irregular shape. In this way, the operator can see the vehicle hitch coupling 108 through the viewing hole 114 to make it easier to back the tractor 12 up to the trailer 10 in alignment for hitching up the trailer. Alternatively, the middle U-shaped member 102 may have two parallel side pieces mounted directly to and extending from the frame 110, without the middle piece between them along the entire length or only the lower portion of the member, which permits the lower portion of the middle U-shaped member to extend below the hole 114 and not block it.

Having described the details of the construction of the trailer 10 of the example embodiment of the invention, a method of using it will now be described with reference to FIGS. 9–13. As shown in FIG. 9, the method includes positioning the trailer 10, which is hitched to and moved by operating the tractor 12, in axial alignment with one or more bales 14 (e.g., the five bales shown). The term "axial" as used here refers to the centerline (or vertical centerplane) of the longitudinal opening 42 of the carrier 16 and the axis of the cylindrical bales 14. Then the trailer 10 is backed up to the bales 14 to begin the loading process. Of course, the trailer 10 can be used to load or unload the bales 14 one at a time, two at a time, or in other quantities, as may be useful in a particular situation.

The loading process includes lowering the carrier 16, as indicated by directional arrow 116 in FIG. 10, from a hauling position to a loading/unloading position on the ground. Typically, this is done by first operating the tractor's hydraulic controls to lower the front end 24 of the carrier 16, then operating the tractor's hydraulic controls to operate the elevation adjustment mechanism 19 to lower the rear end 26. This sequence is generally preferable so that any bales 14 already loaded on the trailer 10 stay there. Alternatively, the tractor's hydraulic controls can be operated to simultaneously to lower the front and rear ends of the carrier 16 evenly, or if the carrier is empty then the elevation adjustment mechanism can be operated first.

Figures 11, 11H:
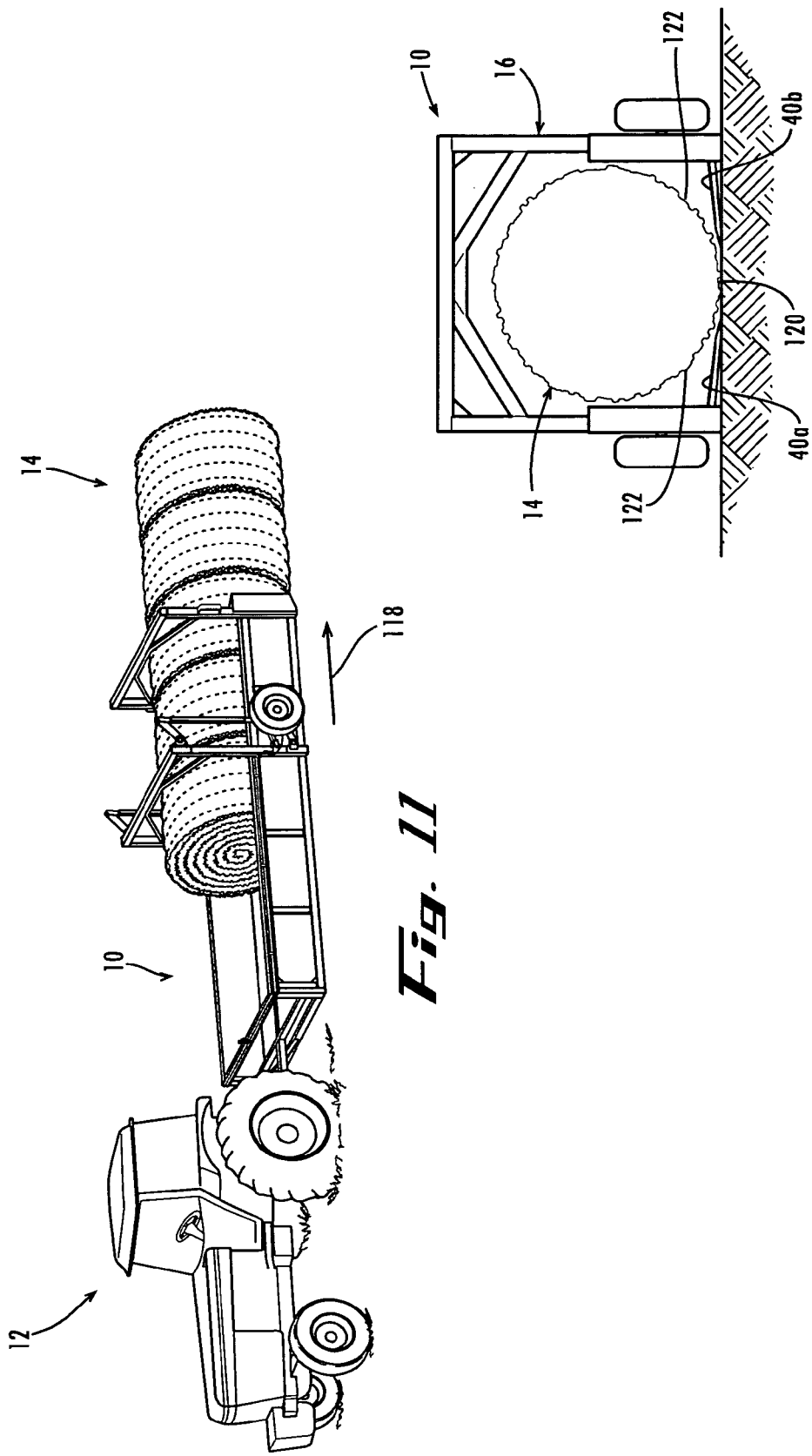
FIG. 11 is a perspective view of the trailer and tractor of FIG. 1, showing the trailer being backed up, the carrier being slid into engagement with the bales, and the bales being loaded onto the carrier.
Figure 12:
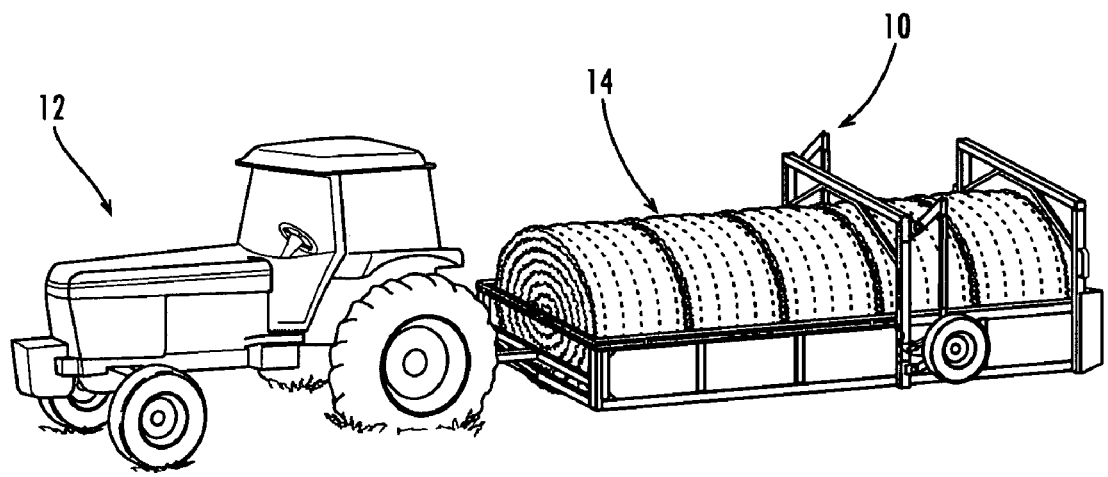
FIG. 12 is a perspective view of the trailer and tractor of FIG. 1, showing all five of the bales fully loaded onto the carrier.

Next, the trailer 10 is moved backwards and slid into axial engagement with a front one of the bales 14, as indicated by directional arrow 118 in FIG. 11. The cylindrical bale 14 is lying on its curved side, with a supporting portion 120 of the bale resting on the ground and with two non-supporting portions 122 of the bale adjacent the supporting portion and not contacting the ground, as shown in FIG. 11A. As the trailer 10 is moved backwards, the bale 14 stays generally still due to friction from the supporting portion 120 of the bale contacting the ground through the opening 42, and at the same time the bottom flanges 40a and 40b slide under the two non-supporting portions 122 of the bale to load the bale onto the carrier 16. To load all five of the bales 14 at once, the trailer 10 is backed up until all the bales are fully loaded onto the carrier 16, as shown in FIG. 12.

Figure 13:
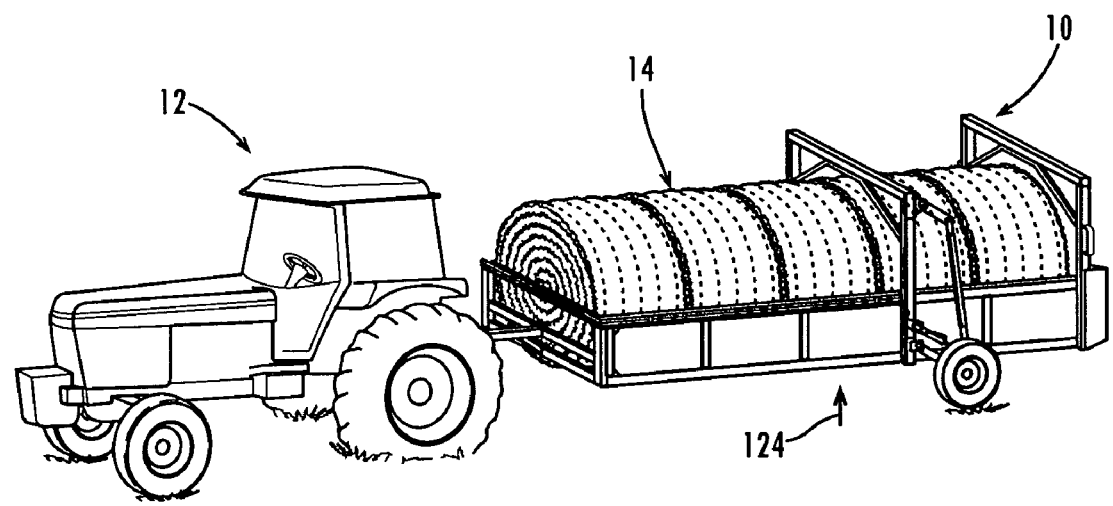
FIG. 13 is a perspective view of the trailer and tractor of FIG. 1, showing the trailer being raised from the ground to the hauling position.

Then the trailer 10 is raised from the loading/unloading position on the ground to the hauling position, as indicated by directional arrow 124 of FIG. 13. Preferably, the step of raising the trailer 10 includes operating the elevation adjustment mechanism 19 to lower the wheels 18 relative to the carrier 16 to raise its rear open end 26 first, and then raising the hitch on the tractor 12 to raise the front end 24 of the carrier. This sequence uses gravity to keep the bales 14 from falling off the back of the carrier 16.

Now the trailer 10 can be towed to another location for unloading one or more of the bales 14. The unloading process includes the steps of lowering the carrier 16, moving it forward to unload the rear-most bale 14, and then raising the carrier. When moving the trailer 10 forward, the bales 14 stay generally still due to friction from the supporting portions 120 of the bales contacting the ground through the opening 42, and the bottom flanges 40a and 40b slide from under the two non-supporting portions 122 of the bale to unload the rear-most bale from the carrier. The bales 14 can be unloaded one-at-a-time at different locations, or multiple bales can be unloaded at once, as may be desired.

The loading and unloading processes may also include the steps of moving the carrier 16 forwards or backwards until the forward-most bale correlates to indicia 64 (see FIG. 3) marked on the carrier. The indicia 64 visibly indicate that all of the bales 14 are fully loaded onto or unloaded off of the carrier 16.

Figure 14:
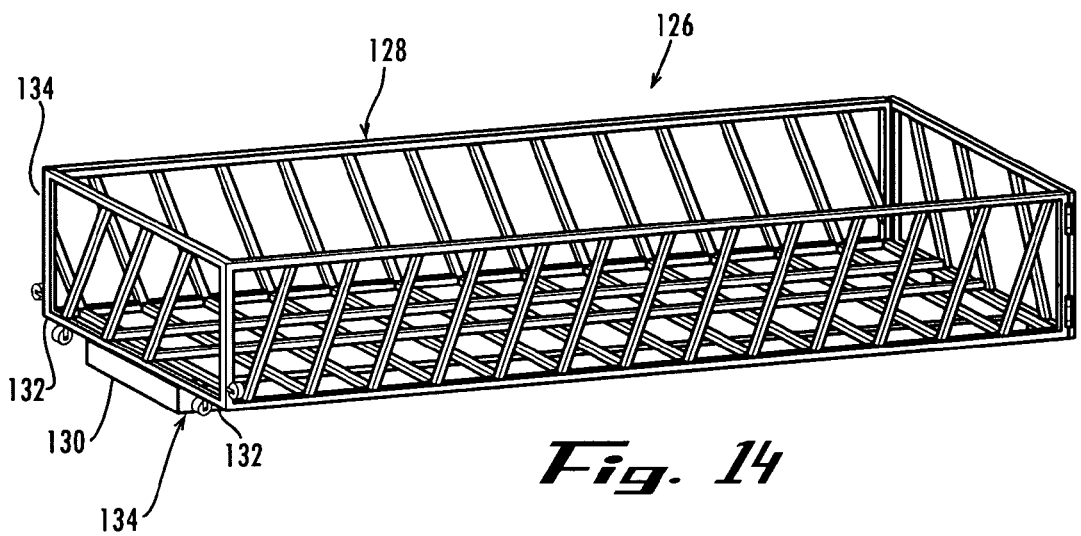
FIG. 14 is a perspective view of a bale rack insert container for use with the trailer of FIG. 1.
Figure 15:
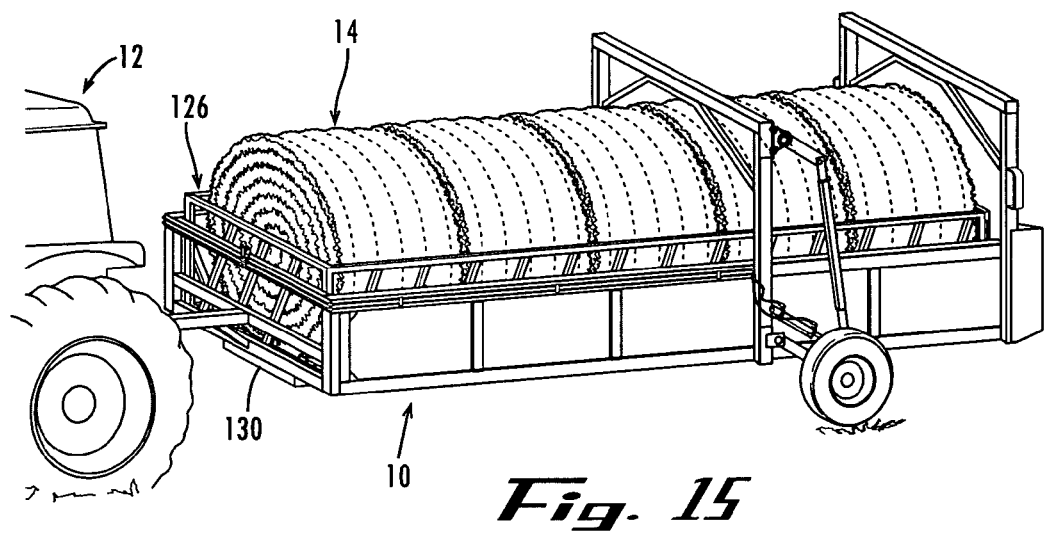
FIG. 15 is a perspective view of the bale rack insert container of FIG. 14 in use with the trailer of FIG. 1.
Figure 16:
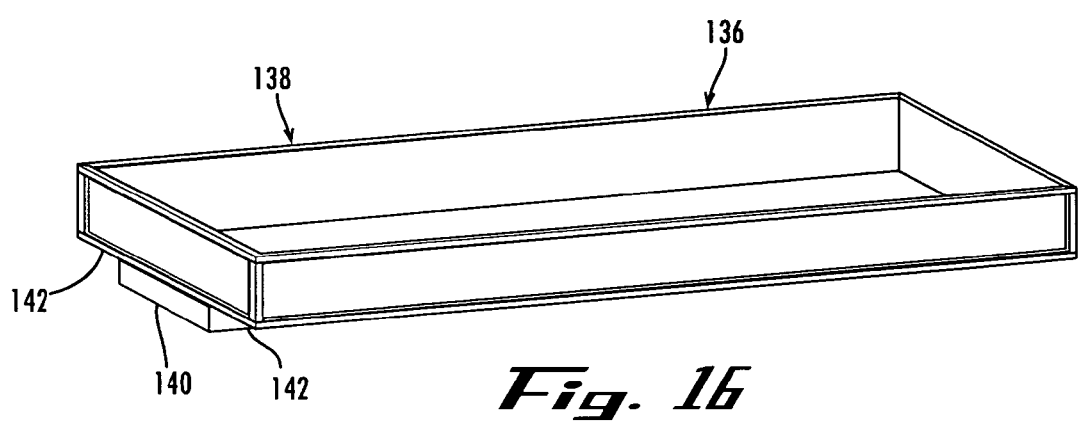
FIG. 16 is a perspective view of a feeder rack insert container for use with the trailer of FIG. 1.

Turning now to FIGS. 14–16, there are shown insert containers that can be used in conjunction with the trailer 10. FIGS. 14 and 15 show a bale rack insert container 126 for holding several of the cylindrical bales 14. The bale rack 126 can be loaded onto and unloaded from the trailer 10 to handle a number of bales 14 at once. In this way, the farmer can more efficiently carry full bale racks 126 out to his fields and leave them spread out in multiple locations, as needed, to feed his livestock. The bale rack 126 includes a frame 128, which may be made of lengths of steel or another material (as shown in the depicted embodiment), panels, walls, latticework, rails, or another frame construction. In addition, the bale rack 126 includes a base portion 130 and two overhang portions 132 above and adjacent the base portion. When loaded onto the trailer 10, the base portion 130 is received through the opening 42 of the carrier 16 (see FIG. 15) when the two overhang portions 132 are supported by the bottom flanges 40*a* and 40*b*. It will be readily understood, then, that the processes for loading and unloading the bale racks 126 are substantially the same as for loading and unloading bales, as described above. If desired, the bale rack 126 may include conventional rollers 134 for minimizing metal-to-metal frictional sliding between the carrier 16 and the bale rack.

FIG. 16 shows a feeder rack insert container 136 for holding loose hay, water, other feed material, or other items such as fence posts, lumber, etc. The feeder rack 136 includes a container 138, which may be made of a bottom wall and peripheral walls made of steel or another material (as shown in the depicted embodiment), a frame, panels, latticework, rails, or another construction. In addition, the feeder rack 136 includes a base portion 140 and two overhang portions 142 above and adjacent the base portion. When loaded onto the trailer 10, the base portion 140 is received through the opening 42 of the carrier 16 when the two overhang portions 142 are supported by the bottom flanges 40*a* and 40*b*. It will be readily understood, then, that the processes for loading and unloading the feeder rack 136 are substantially the same as for loading and unloading the bale rack, as described immediately above.

It will be understood that the trailer and other components described herein are provided for illustrative purposes only, and that the present invention includes other embodiments not specifically described herein. For example, in one alternative embodiment the apparatus for handling bales is a self-powered vehicle instead of a towable trailer. In this embodiment, the apparatus includes the carrier, four of the wheels, and an engine and/or another propulsion system, but not the hitch. And in another alternative embodiment, the elevation adjustment mechanism includes components (similar to those described herein) for raising and lowering wheels at the front of the carrier, in addition to or instead of the raising and lowering the rear wheels. Preferably, in this embodiment the elevation adjustment mechanism is configured to raise and lower the front and rear of the carrier simultaneously and/or in a staggered sequence, as described above.

Accordingly, the present invention provides a number of advantages not found in known farm equipment. The trailer can be used in conjunction with the adapter and/or one of the insert containers to much more efficiently handle bales of hay or other material. In particular, the trailer can be used to quickly and easily load the bales, haul them out to a pasture, and unload them, thereby saving a significant amount of time and money.

It is to be understood that this invention is not limited to the specific devices, methods, conditions, or parameters described and/or shown herein, and that the terminology used herein is for the purpose of describing particular embodiments by way of example only. Thus, the terminology is intended to be broadly construed and is not intended to be limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

What is claimed is:

1. A trailer for use with a towing vehicle for handling cylindrical bales, comprising:

a carrier for the bales, the carrier having a first side with a bottom portion, an opposing second side with a bottom portion, a first bottom flange extending inwardly from the first side bottom portion, a second bottom flange extending inwardly from the second side bottom portion, the first and second bottom flanges fixed so they do not move relative to the respective side bottom portions from which they extend, the first and second bottom flanges spaced apart and defining an opening therebetween, a closed front end that blocks the passage of the bales, and an open rear end through which the bales pass during loading and unloading, the open end in communication with the opening, wherein the opening has a length that is long enough to receive a plurality of the bales on the carrier in series, and wherein the carrier has indicia marked thereon in serial positions that correspond to the bales to provide a visible indication of the rearmost bale being fully loaded onto or unloaded from the carrier.

a trailer hitch coupling connected to the carrier for permitting forward and rearward movement of the trailer without a lateral offset relative to the towing vehicle;

two wheels operably coupled to the carrier; and an elevation adjustment mechanism comprising two actuators operably coupled between the carrier and the wheels and adapted to raise and lower the carrier, wherein upon operating the elevation adjustment mechanism to lower the carrier to ground and then moving the carrier backwards into axial engagement with one of the bales, with a supporting portion of the bale resting on the ground and with two non-supporting portions of the bale adjacent the supporting portion and not contacting the ground, the bale stays generally still due to friction from the supporting portion of the bale contacting the ground through the opening as the bottom flanges slide under the two non-supporting portions of the bale to load the bale onto the carrier.

2. The trailer of claim 1, wherein the carrier further comprises at least one rear overhead support frame that extends from the first side to the second side and below which the bales pass during loading and unloading.

3. The trailer of claim 1, wherein the opening has a width and the first bottom flange and the second bottom flange have a combined width that is less than the opening width.

4. The trailer of claim 1, wherein the opening extends unobstructed along its entire length.

5. The trailer of claim 1, wherein the first bottom flange extends inwardly from above a bottom edge of the first side bottom portion and extends downwardly as it extends inwardly, and the second bottom flange extends inwardly from above a bottom edge of the second side bottom portion and extends downwardly as it extends inwardly.

6. The trailer of claim 1, wherein the first bottom flange and the second bottom flange each have a beveled leading end at the open rear end of the carrier.

7. The trailer of claim 1, wherein the elevation adjustment mechanism further comprises two connecting members, with a first one of the connecting members coupled to a first one of the wheels and pivotally coupled to the carrier, and a second one of the connecting members coupled to a second one of the wheels and pivotally coupled to the carrier.

8. The trailer of claim 7, wherein the elevation adjustment mechanism further comprises two control members with a first one of the control members coupled to a first one of the wheels and a second one of the control members coupled to a second one of the wheels, a first one of the actuators is pivotally coupled to the first control member and pivotally coupled to the carrier, a second one of the actuators is pivotally coupled to the second control member and pivotally coupled to the carrier, and the first and second actuators are operable to pivot the first and second connecting members.

9. The trailer of claim 1, further comprising a first axle on which a first one of the wheels rotates and a second axle on which a second one of the wheels rotates, wherein the first and second axles are operably coupled to the carrier, rotate independently of each other, and do no extend across the opening.

10. The trailer of claim 9, wherein the actuators comprise fluid cylinders, and the elevation adjustment mechanism further comprises fluid lines connected to the fluid cylinders, and at least one flow divider valve connected to the fluid lines and adapted to adjust the fluid pressure to the cylinders to move the wheels up and down together in a coordinated fashion to maintain the trailer generally level from side-to-side.

11. The trailer of claim 9, wherein the elevation adjustment mechanism further comprises at least one overhead frame under which the bales can pass, an overhead rotatable axle coupled to the overhead frame, and two linkages operably coupled between the overhead axle and the wheels and adapted to correlate vertical movement of the wheels so that the wheels move together in a coordinated fashion to maintain the trailer generally level from side-to-side.

12. The trailer of claim 1 in combination with an adapter for hitching the trailer to a towing vehicle with a three-point pintle hitch, the adapter comprising a frame with three vertically oriented U-shaped members, each U-shaped member defining a plurality of aligned sets of holes, three pins receivable in the aligned sets of holes for coupling to the tractor three-point pintle hitch at a plurality of elevations, and a towing vehicle hitch coupling that removably engages the trailer hitch coupling of the trailer.

13. The trailer and adapter combination of claim 12, wherein the frame has a vertical middle support member to which a middle one of the U-shaped members is mounted, the towing vehicle hitch coupling is aligned with the middle support member, and the middle support member defines a viewing hole positioned below at least a portion of the middle U-shaped member and above the towing vehicle hitch coupling to define a line-of-sight for viewing the towing vehicle hitch coupling by an operator of the towing vehicle.

14. The trailer of claim 1 in combination with an insert container that is received by the carrier, the container comprising a base portion and two overhang portions above and adjacent the base portion, wherein the base portion is received through the opening when the two overhang portions are supported by the bottom flanges.

15. A method of handling cylindrical bales using the trailer of claim 1, comprising:
lowering the carrier to ground;
moving the carrier backwards into axial engagement with one of the bales, with a supporting portion of the bale resting on the ground and with two non-supporting portions of the bale adjacent the supporting portion and not contacting the ground, so that the bale stays generally still due to friction from the supporting portion of the bale contacting the ground through the opening, and the fixed bottom flanges slide under the two non-supporting portions of the bale to load the bale onto the carrier;
raising the carrier from the ground; and
towing the trailer to another location for unloading.

16. The method of claim 15, further comprising:
repeating the steps of claim 15 for at least one additional bale; and
moving the carrier backwards until one of the bales correlates to indicia marked on the carrier to visibly indicate that the bales are fully loaded onto the carrier.

17. The method of claim 15, wherein the step of raising the carrier from the ground comprises lowering the wheels relative to the carrier to raise the rear open end, and then raising the hitch coupling on the towing vehicle to raise a front end of the carrier, wherein gravity works to keep the bales from falling off the carrier.

18. The method of claim 15, further comprising:
lowering the carrier to the ground;
moving the carrier forward so that the bale stays generally still due to friction from the supporting portion of the bale contacting the ground through the opening, and the bottom flanges slide from under the two non-supporting portions of the bale to unload the bale from the carrier; and
raising the carrier from the ground.

19. A trailer for handling cylindrical bales, comprising:
a carrier for the bales, the carrier having a first side with a bottom portion, an opposing second side with a bottom portion, a first bottom flange extending inwardly from the first side bottom portion, a second bottom flange extending inwardly from the second side bottom portion, the first and second bottom flanges spaced apart and defining an opening therebetween, an open rear end through which the bales pass during loading and unloading, the open end in communication with the opening, and at least one overhead frame under which the bales can pass;
a trailer hitch coupling connected to the carrier;
two wheels operably coupled to two axles which in turn are operably coupled to the carrier, wherein the first and second axles rotate independently of each other and do not extend across the opening; and
an elevation adjustment mechanism comprising two actuators operably coupled between the carrier and the wheels and adapted to raise and lower the carrier, an overhead rotatable axle coupled to the overhead frame, and two linkages operably coupled between the overhead axle and the wheels and adapted to correlate vertical movement of the wheels so that the wheels move together vertically in a coordinated fashion to maintain the trailer generally level from side-to-side,
wherein upon operating the elevation adjustment mechanism to lower the carrier to ground and then moving the carrier into axial engagement with one of the bales, with a supporting portion of the bale resting on the ground and with two non-supporting portions of the bale adjacent the supporting portion and not contacting the ground, the bale stays generally still due to friction from the supporting portion of the bale contacting the ground through the opening as the bottom flanges slide under the two non-supporting portions of the bale to load the bale onto the carrier.

* * * * *